April 17, 1951 J. E. BALL 2,548,932
ELECTRICALLY HEATED TABLE
Filed Aug. 12, 1948
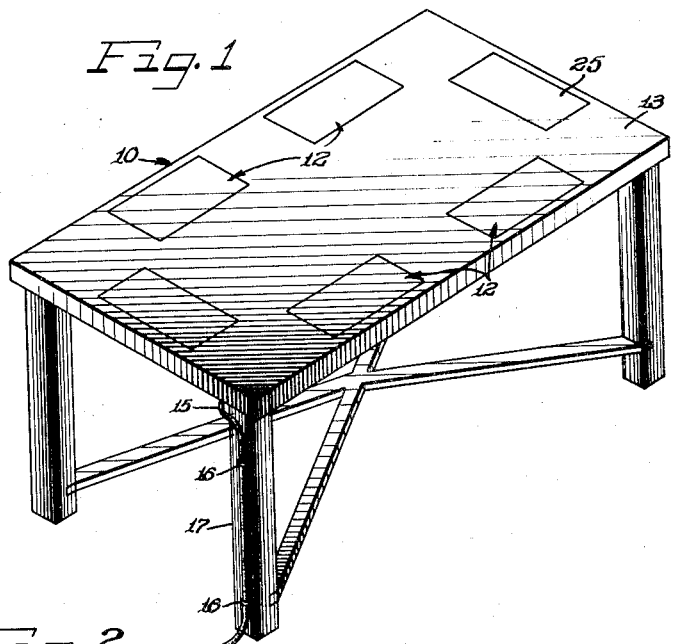
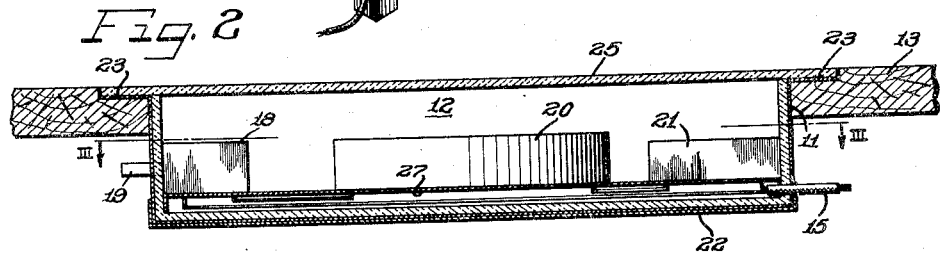
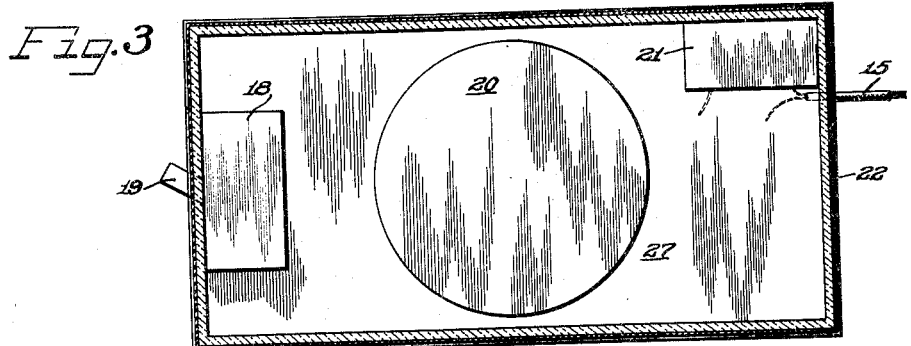
Inventor
Joseph E. Ball
By The Firm of Charlesworth Attys Patented Apr. 17, 1951

2,548,932

UNITED STATES PATENT OFFICE 2,548,932

ELECTRICALLY HEATED TABLE

Joseph E. Ball, Roswell, N. Mex.

Application August 12, 1948, Serial No. 43,899

2 Claims. (Cl. 219—19)

This invention relates to electrically heated warmers for dining tables, and more particularly to a novel method and means for maintaining a uniform and constant predetermined temperature of food served to diners at dining tables or counters. It has long been a difficulty experienced by those whose business it is to serve food to the public, or for housewives who serve one or more persons in smaller groups, that food, although prepared in the most exacting manner with the choicest ingredients and most inviting of recipes, is frequently made to become less appetizing during extended dining periods by the mere fact that the food cools before consumption. To alleviate this condition, many devices have been developed in the past for keeping food warm before or during the serving period. Very little, if anything, has been done, however, to maintain the temperature of food throughout the dining period.

This invention has, therefore, for one of its principal features and objects, the provision of a food warmer at each individual serving position of a dining table or counter which enables edibles to be served and maintained at the proper temperature for fullest food value or taste enjoyment without fear that cooling will affect such factors while the meal is in progress.

It is another object of this invention to provide a food warmer which will automatically maintain food at a proper temperature for eating, regardless of the delay experienced after placement in dining position and before consumption of such food.

Still another object of the present invention is to provide a food warmer which will maintain food at a predetermined proper eating temperature throughout a meal period regardless of the number of interruptions that may occur or the time that may be required for the individual to consume such a meal.

A further object of the present invention is to provide a novel electrical food warmer in which a dish or food carrier is substantially isolated from the electrical circuit to insure a high degree of safety in the event that electrical faults should occur.

It is still a further object of this invention to provide a food warmer for dining tables which is within control of the person served in that the warmer may be used or not, as desired.

The novel features which I believe to be characteristic of my invention are set forth with particularity in the appended claims. My invention, however, as to its organization, manner of construction, and method of operation, together with further objects and advantages thereof may be best understood by a reference to the following description taken in connection with the accompanying drawings in which:

Figure 1 is a perspective view of a serving table including individual food warmers at each serving position;

Figure 2 is an elevational view of a food warmer embodying the novel features of my invention; and Figure 3 is a plan view of the food warmer as taken on sectional line III—III of Figure 2.

As shown on the drawings:

Referring now more particularly to the drawings in which like numerals designate like parts in the various figures, a dining table 10 shown in Figure 1 may be substantially any table on which warm meals might be served. Apertures 11 are provided in front of each position at which persons may be seated during a meal. Electrically heated food warmers 12 are fitted into each of the apertures, flush with the table top so that no projection or recess exists at any point to hinder or resist sliding movement of dinnerware over the smooth table top 13 or the cleaning of said table top. Power for the electrical warmer 12 is supplied from any suitable electrical power source through a conductor 15 which may be conveniently fastened by means of staples 16 to one of the table legs 17 or which may be hidden from view within a hollow leg provided on such a table. The conductor 15 runs under the table to each warmer unit 12, all of which are electrically connected in parallel.

Each warmer unit 12 is provided with a conveniently located conventional type on-off switch 18 which enables a person dining at the table to turn the warmer on or off at any time during the progress of the meal by merely reaching under the edge of the table top 13 and flicking the switch button 19 in the proper direction. The warmer 12, itself, is comprised essentially of the on-off switch 18, a heating element 20 which may be of any suitable design sufficient to generate heat to elevate the air temperature within the warmer 12, and a thermostatically controlled switch 21; all encased within a container 22 which is insulated both electrically and thermodynamically with material such as asbestos. The outer shell of the container 22 is made of relatively thin gauge sheet metal with flanges 23 extending in an outward direction on the upper edge of the shell 22. These flanges 23 are made of such width that they can be fitted closely in the recessed surface provided at the edge of each aperture 11 in the table top 13.

The container 22 is lined throughout with asbestos or other material which will provide both thermodynamic and electrical insulation. Only the switch button 19 and the conductor 15 project through the walls of container 22. The cover 25 is of the same asbestos material used for insulating the walls of the container or may be any other electrical insulating material available in sheet form having the desired thermal insulating properties. The cover 25 which is closely fitted within the recessed portions of the table surface provided around each of the apertures 11 is of such thickness that its top is flush with the table top 13.

The on-off switch 18, heating element 20, and thermostatic control switch 21 are electrically connected in series and mounted on a metal chassis 27 which fits closely in the bottom of the container. The depth of the container 22 is sufficient to assure that the electrical elements 18, 20 and 21 will not come in contact with the container cover 25 and that free circulation of air over these elements is not hindered. In addition, the container is made of such depth that electrical faults such as shorts and grounds would be far enough below the top of the container that they would not endanger persons eating food from plates placed over the container top 25.

In operation, the warmer on-off switch button 19 is turned on and the heat generated by the heating element 20 warms the air within the container. Free circulation of the warm air assures uniform distribution of the generated heat throughout the space under cover 25 and thus transmission through the cover is uniform over the entire cover area. More heat is transmitted through the cover 25 by reason of the fact that the natural movement of heat is upward and the fact that the other walls describing the space enclosed by the container are covered with sheet metal. The upward transmission of heat is further aided by the chassis 27 which acts as a space separator below which heat is not readily transmitted and air cannot freely circulate.

Thus, since more heat is transmitted through the container cover 25, the upper surface of the container 22 is kept warmer than the surrounding walls so that dishes or platters of food placed thereon will be maintained at a predetermined elevated temperature suitable for prevention of food spoilage during progress of a meal. The predetermined proper temperature is maintained substantially constant by operation of the thermostat 21 which cuts the heating element 20 in and out of the power circuit as the air within the container cools or is heated by the heating element 20.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. An electrical warming unit for dining tables comprising a heating element, an on-off switch and a thermostatic control switch all electrically connected in series and encased within a container which is both thermally and electrically insulated, said container being of sufficient depth to allow free circulation of air over said electrically connected elements and having a cover of electrical insulating material with a low heat transmission characteristic.

2. An electrical warming unit for dining tables comprising a sheet metal container lined with electrical and thermal insulating material, a chassis disposed close to the bottom of said container, a heating element centrally mounted on said chassis, an on-off switch mounted on said chassis at one side of said heating element, a thermostatic control switch mounted on said chassis at an opposite side of said heating element, said heating element, on-off switch and thermostatic control switch being electrically connected in series for connection to a suitable source of electric power, said container being of sufficient depth to provide free circulation of air over said electrically connected elements and switches, and a cover for said container made of material having both thermal and electrical insulating properties.

JOSEPH E. BALL.

REFERENCES CITED

The following references are of record in the file of this patent:

UNITED STATES PATENTS

| Number | Name | Date |
|---|---|---|
| 791,708 | Matcovitch | June 6, 1905 |
| 1,377,435 | Rasen | May 10, 1921 |
| 1,990,640 | Doherty | Feb. 12, 1935 |
| 2,043,797 | Horn | June 9, 1936 |
| 2,070,482 | Hawkins | Feb. 9, 1937 |
| 2,139,153 | Frolich | Dec. 6, 1938 |
| 2,187,196 | Douglass | Jan. 16, 1940 |
| 2,251,582 | White | Aug. 5, 1941 |
| 2,452,126 | Irwin, Jr. | Oct. 26, 1948 |

FOREIGN PATENTS

| Number | Country | Date |
|---|---|---|
| 444,200 | Great Britain | Mar. 16, 1936 |